United States Patent
Aoshima (10) Patent No.: US 8,142,585 B2
(45) Date of Patent: Mar. 27, 2012

(54) POLYMER FILM SPLICING METHOD AND DEVICE, AND STRETCHING METHOD

(75) Inventor: Shinsuke Aoshima, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 12/907,377

(22) Filed: Oct. 19, 2010

(65) Prior Publication Data

US 2011/0030877 A1   Feb. 10, 2011

Related U.S. Application Data

(62) Division of application No. 12/181,643, filed on Jul. 29, 2008, now abandoned.

(30) Foreign Application Priority Data

Jul. 30, 2007 (JP) .................................. 2007-197725
Sep. 19, 2007 (JP) .................................. 2007-242414

(51) Int. Cl.
 *B32B 37/00* (2006.01)

(52) U.S. Cl. ......... 156/73.4; 156/85; 156/157; 156/229; 156/305

(58) Field of Classification Search ................ 156/73.1, 156/73.4, 157, 228, 229, 305, 308.2, 308.4, 156/494, 502, 580.1, 580.2, 583.1, 84, 85
See application file for complete search history.

(56) References Cited

U.S. PATENT DOCUMENTS 5,014,407 A * 5/1991 Boughten et al. ............... 29/235
7,838,770 B2 * 11/2010 Portas et al. ................. 174/84 R

FOREIGN PATENT DOCUMENTS

| JP | 42-014190 Y1 | 8/1967 |
| JP | 53-020268 U | 2/1978 |
| JP | 53-051864 U | 5/1978 |
| JP | 04-144867 A | 5/1992 |
| JP | 2002-311240 A | 10/2002 |
| JP | 2004-160665 A | 6/2004 |

OTHER PUBLICATIONS

Notification of Reasons for Refusal, dated Dec. 7, 2011, issued in corresponding JP Application No. 2007-197725, 5 pages in English and Japanese.

* cited by examiner

*Primary Examiner* — James Sells
(74) *Attorney, Agent, or Firm* — Sughrue Mion, PLLC (57) ABSTRACT

An off-line stretching device includes a film supply chamber, a tenter section, a relaxation chamber, a cooling chamber, and a winding chamber. The film supply chamber includes a splicing section, where a rear end of a preceding film and a front end of a trailing film are overlapped to be spliced to each other by thermal welding. The thermal welding is performed from above and below the film while a temperature of welding heads of a heat sealer, contacting with the film, is kept at a level equal to or less than a decomposition temperature of the preceding and trailing films. The spliced film is stretched in the tenter section and subjected to heat treatment for stress relaxation in the relaxation chamber, to shrink in a film width direction.

5 Claims, 12 Drawing Sheets

POLYMER FILM SPLICING METHOD AND DEVICE, AND STRETCHING METHOD

This application is a divisional of U.S. application Ser. No. 12/181,643, filed Jul. 29, 2008, now abandoned which claims priority to JP Application No. 2007-197725, filed Jul. 30, 2007, and JP Application No. 2007-242414, filed Sep. 19, 2007, each of which is incorporated herein by reference in its entirety.

FIELD OF THE INVENTION

The present invention relates to a polymer film splicing method and device, and a polymer film stretching method.

BACKGROUND OF THE INVENTION

Recently, in accordance with rapid development and popularization of liquid crystal display (LCD) or the like, the demand for a cellulose ester (cellulose acylate) film, in particular, a triacetyl cellulose (TAC) film used as a protective film for the LCD or the like, has been increasing. According to the increase in the demand for the TAC film, the improvement in productivity thereof has been desired. The TAC film is produced as follows. A dope containing the TAC and a solvent is cast through a casting die onto a support continuously moving to form a casting film thereon. The casting film is dried or cooled to be solidified. The solidified casting film is peeled from the support to form a wet film. The wet film is dried and wound as a film. According to a solution casting method described above, it is possible to form a film containing less foreign materials and having more excellent optical properties in comparison with a film forming method by melt-extrusion.

In the solution casting method, as the support onto which the dope is cast, a band and a drum are used. The drum can achieve improvement in a casting speed more readily in comparison with the band. In order to solidify the casting film on the support, the casting film is dried, or cooled so as to turn into gel. Additionally, in order to adjust the optical properties of the TAC film, in particular retardation thereof, the TAC film is stretched.

The optimum film producing speed and the optimum stretching speed are different from each other. The film producing speed requires more time than the stretching speed. Therefore, in the case that the stretching speed is adjusted in accordance with the film producing speed, it is impossible to stretch the film enough to improve the optical properties. Accordingly, it is proposed that the film is stretched in an off-line manner independently from a solution casting line (see Japanese Patent Application Laid-open No. 2002-311240, for example).

In a case where the film is stretched in an off-line manner independently from the solution casting line as disclosed in Japanese Patent Application Laid-open No. 2002-311240, for the purpose of efficiently performing the stretching process, the TAC film is preferably stretched continuously. In this case, in order to supply the film continuously, a portion in which a rear end of a preceding polymer film and a front end of a trailing polymer film are overlapped with each other is heated to be welded. Thereby, the preceding film and the trailing film are spliced to each other (see Japanese Utility Model Applications Laid-open No. 53-020268 and 53-051864, for example).

However, as disclosed in Japanese Utility Model Applications Laid-open No. 53-020268 and 53-051864, when a heater is disposed above or below the portion in which the preceding and trailing polymer films are overlapped with each other, in the case that the temperature of the heater is raised or in the case that the contact time between the heater and the film is increased for the purpose of enhancing the welding, the temperature of the heated film exceeds the degradation temperature of the polymer in the film in some cases. The polymer film, in particular, cellulose ester film has the melting point of 300° C. and the decomposition temperature of more than 300° C. Since the melting point and the decomposition temperature are close to each other, in the case that the welding temperature is set higher for the purpose of welding the film sufficiently, pitting occurs on the welded portion of the polymer films or the degradation of the polymer proceeds due to the overheating of the polymer film. Accordingly, there is a problem that it is impossible to achieve sufficient splicing strength.

In an off-line stretching device, the TAC film is subjected to a splicing process for splicing a preceding film and a trailing film, a stretching process for stretching the spliced TAC film by holding the side ends thereof with use of plural clips in a film width direction while heating the TAC film continuously transported, and a relaxation process for subjecting the TAC film thus stretched to heat treatment for stress relaxation (for example, see U.S. application Ser. No. 12/058,631 corresponding to Japanese Patent Application No. 2007-084424). In the splicing process, as an easy splicing device, a single-sided splicing tape is used. In general, the single-sided splicing tape has a sheet as a base and an adhesive layer formed on one surface of the base. The base material of the base is different from that of the TAC film.

Figure 11:
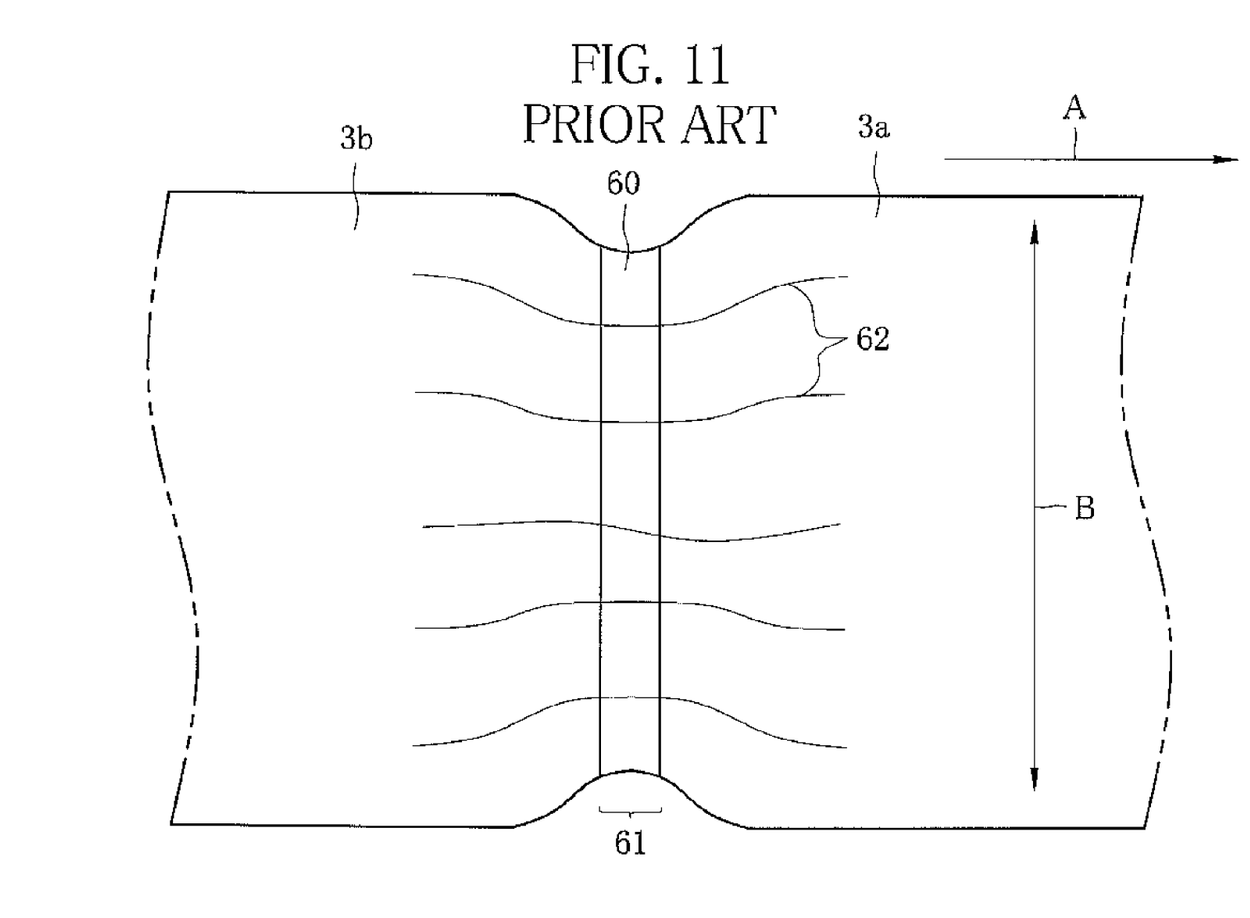
FIG. 11 is a view illustrating a film subjected to a stretching process and heat treatment for stress relaxation in a conventional manner.

Further, the TAC film subjected to the stretching process and heat treatment for stress relaxation in the off-line stretching device shrinks in the film width direction after the heat treatment for stress relaxation. The thermal shrinkage amount of the base of the single-sided splicing tape and the thermal shrinkage amount of the film are different from each other. Therefore, as shown in FIG. 11, in the case that a preceding film 3a and a trailing film 3b are overlapped with each other and a single-sided splicing tape 60 is adhered thereon so as to extend in a film width direction B in order to splice the preceding film 3a and the trailing film 3b, the shrinkage amount of a spliced area 61 is larger than that of an area around the spliced area 61 (peripheral area). As a result, wrinkles 62 occur in the spliced area 61.

When the wrinkles 62 occur in the spliced area 61, the wrinkles 62 also occur in the peripheral area. The area having the wrinkles 62 can not be used as a product and need to be discarded. Therefore, there is a problem that the area as a product is decreased. Further, in some cases, the TAC film breaks due to the occurrence of wrinkles 62, thus causing a problem. The above-described problems are not limited to the TAC film, and also applied to other polymer films.

Accordingly, there is a problem that it is not possible to obtain sufficient splicing strength in the case that the splicing is performed by welding, and further wrinkles occur on the film which is subjected to welding, splicing, stretching, and the heat treatment for stress relaxation.

SUMMARY OF THE INVENTION

To solve the above problems, a first object of the present invention is to provide a splicing method and device for more infallibly splicing polymer films by thermal welding even though the polymer film such as cellulose ester film is easily thermally decomposed. A second object of the present invention is to provide a polymer film stretching method capable of preventing occurrence of wrinkles in a film spliced area after a heat treatment for stress relaxation.

To achieve the first object, according to the present invention, there is provided a splicing method of a polymer film including the steps of: overlapping a rear end of a preceding polymer film and a front end of a trailing polymer film; pressing welding heads against a portion in which the preceding and trailing films are overlapped with each other from each side in a film overlapping direction while sandwiching the portion between the welding heads; and welding the films while keeping a temperature of the welding heads contacting the film at a temperature equal to or less than a decomposition temperature of the polymer film, to splice the rear end and the front end to each other. Note that the polymer film may be a cellulose ester film.

Further, according to the present invention, there is provided a splicing device of a polymer film including: a welding head provided at each side of a portion in which a rear end of a preceding polymer film and a front end of a trailing polymer film are overlapped with each other in a film overlapping direction; a shifter for moving the welding heads in the film overlapping direction between a pressing position and a retracted position, the welding heads sandwiching and pressing a portion in which the preceding and trailing films are overlapped with each other in the pressing position, and the welding heads being retracted from the pressing position in the retracted position; and a heating controller for heating the welding heads contacting the preceding and trailing film at a temperature equal to or less than a decomposition temperature of the polymer film after the welding heads is shifted to the pressing position by the shifter. Note that the polymer film may be a cellulose ester film.

According to the film splicing method of the present invention, the portion in which the preceding and trailing films are overlapped with each other is heated from both sides, and therefore it is possible to shorten the heat transfer distance between the film surface and the film splicing surface. Further, while the temperature of the portion in which the preceding and trailing films are overlapped with each other is kept at a level equal to or less than a decomposition temperature of the film, the overlapped portion can be welded. Accordingly, it is possible to surely perform high-speed welding of the films each having a melting point and decomposition point close to each other such as a polymer film, in particular, cellulose ester film while preventing occurrence of pitting.

Additionally, since it is possible to shorten the heat transfer distance between the film surface and the film splicing surface, it is also possible to decrease heating amount for the welding. Thereby, electricity supplied to the heater can be decreased to achieve improvement in energy conservation.

To achieve the second object, according to a polymer film stretching method of the present invention, a portion in which a rear end of a preceding polymer film and a front end of a trailing polymer film are overlapped with each other is welded. Thereby, the preceding film and the trailing film are spliced to each other. The spliced polymer films are continuously transported. Side ends of the spliced polymer film are held with use of plural clips to be stretched in a film width direction while the polymer film is being heated. While being continuously transported, the stretched polymer film is subjected to a heat treatment for stress relaxation such that a shrinkage amount of a spliced area of the preceding and trailing polymer films and a shrinkage amount of an area around the spliced area are approximately equal to each other in the film width direction. Note that the welding is performed with use of heat caused by an ultrasonic splicer or a heat sealer, or a polymer solvent.

Further, according to a polymer film stretching method of the present invention, a splicing tape having an adhesive layer and no base is adhered to a portion in which a rear end of a preceding polymer film and a front end of a trailing polymer film are overlapped with each other. Thereby, the preceding film and the trailing film are spliced to each other. The spliced polymer films are continuously transported. Side ends of the spliced polymer film are held with use of plural clips to be stretched in a film width direction while the polymer film is being heated. While being continuously transported, the stretched polymer film is subjected to a heat treatment for stress relaxation such that a shrinkage amount of a spliced area of the preceding and trailing polymer films and a shrinkage amount of an area around the spliced area are approximately equal to each other in the film width direction.

According to the polymer film stretching method of the present invention, the portion in which the rear end of the preceding polymer film and the front end of the trailing polymer film are overlapped with each other is welded, and thereby the preceding film and the trailing film are spliced to each other, such that the shrinkage amount of the spliced area of the preceding and trailing polymer films and the shrinkage amount of the area around the spliced area after the heat treatment for stress relaxation are approximately equal to each other in the film width direction. Therefore, after the heat treatment for stress relaxation, no wrinkles occur in the film spliced area and no tears occur in the area around the spliced area.

Additionally, according to the polymer film stretching method of the present invention, the preceding film and the trailing film are spliced with use of the double-sided adhesive tape having the adhesive layer and no base such that the shrinkage amount of the spliced area of the preceding and trailing polymer films and the shrinkage amount of the area around the spliced area after the heat treatment for stress relaxation are approximately equal to each other in the film width direction. Therefore, after the heat treatment for stress relaxation, no wrinkles occur in the film spliced area and no tears occur in the area around the spliced area.

BRIEF DESCRIPTION OF THE DRAWINGS

One with ordinary skill in the art would easily understand the above-described objects and advantages of the present invention when the following detailed description is read with reference to the drawings attached hereto.

DESCRIPTION OF THE PREFERRED EMBODIMENTS

Embodiments of the present invention are described hereinbelow. The present invention, however, is not limited to the following embodiments.

Embodiment 1

Figure 1:
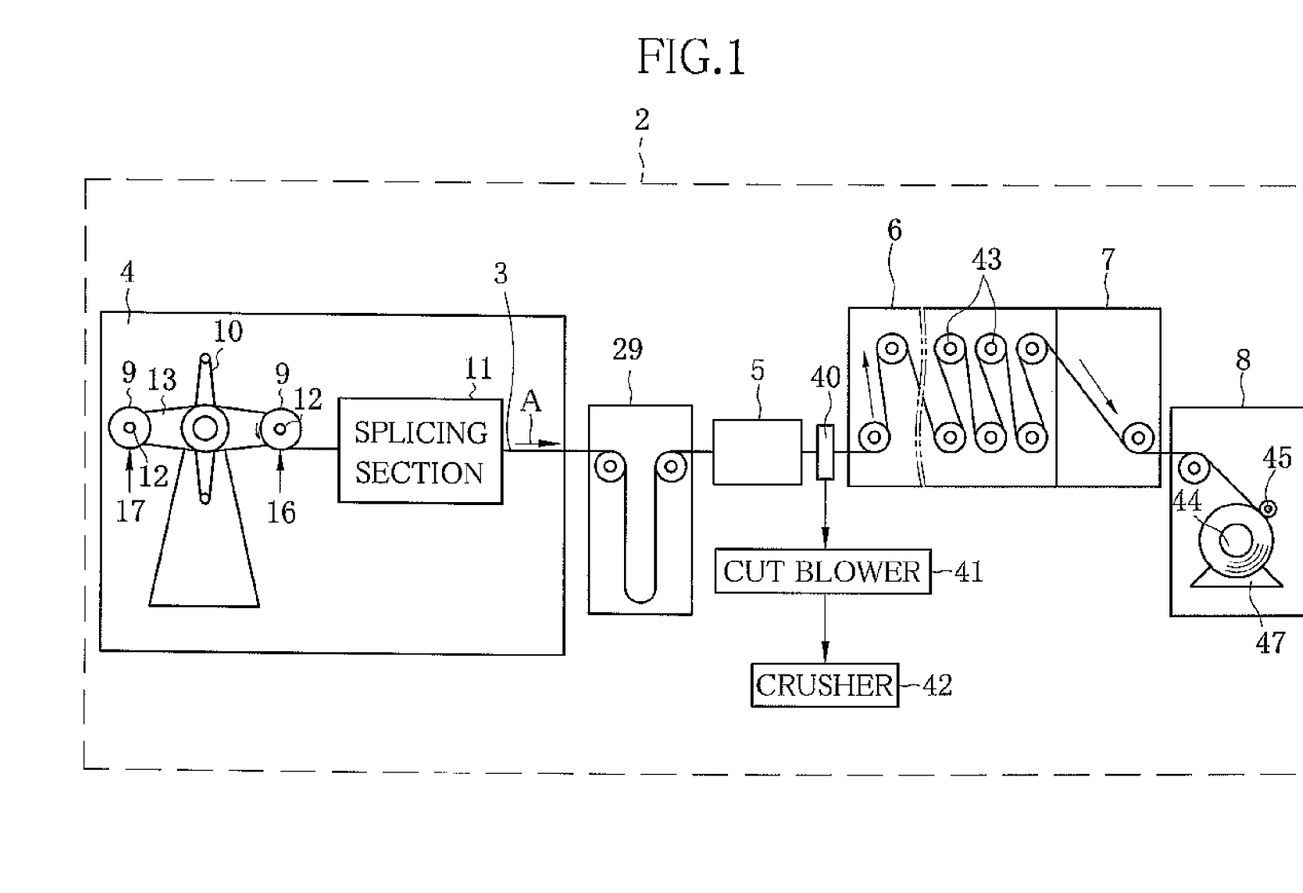
FIG. 1 is a plan view illustrating an off-line stretching device according to an embodiment of the present invention.

As shown in FIG. 1, an off-line stretching device 2 is used for stretching a TAC film 3 (hereinafter referred to as film 3), and includes a film supply chamber 4, a tenter section 5, a relaxation chamber 6, a cooling chamber 7, and a winding chamber 8 disposed in this order from a upstream side along a film transporting direction A. A film roll 9 produced in a solution casting apparatus is loaded in the film supply chamber 4. The film roll 9 is obtained by winding the film 3 around a core in a roll manner. The film 3 is fed from the film roll 9 loaded in the film supply chamber 4 to the tenter section 5. In the tenter section 5, the film 3 is continuously stretched in a film width direction while being heated. The stretched film 3 passes through the relaxation chamber 6 and the cooling chamber 7 to be cooled. The cooled film 3 is wound in the winding chamber 8. In the tenter section 5, the film 3 is stretched in the film width direction by 100.5% to 300%. In each of the film supply chamber 4, the tenter section 5, the relaxation chamber 6, the cooling chamber 7, and the winding chamber 8, there is provided an edge position controller (EPC) (not-shown) for controlling such that the film 3 is transported in a precise manner without meandering.

The film supply chamber 4 includes a turret-type film feeding device 10 and a splicing section 11. The film feeding device 10 includes a turret arm 13 provided with a mounting shaft 12 at each end. The film roll 9 is loaded to each of the mounting shafts 12. The turret arm 13 makes half a rotation intermittently. In the intermittent rotation by 180°, one of the mounting shafts 12 is set at a film feeding position 16 (at a side of the splicing section 11), and the other thereof is set at a core replacement position 17. The film 3 is fed to the splicing section 11 from a film roll 9 mounted to the mounting shaft 12 located at the film feeding position 16. When the film 3 located at the film feeding position 16 is used up, the turret arm 13 rotates, and an empty roll is removed from the mounting shaft 12 located in the core replacement position 17, and then a new film roll 9 is mounted thereto. Upon completing feeding of the film 3 from the film roll 9 loaded to the mounting shaft 12 located at the film feeding position 16, the turret arm 13 rotates by 180° to set the film roll 9 loaded to the other mounting shaft 12 at the film feeding position 16, thus feeding the film 3. Concurrently, the rear end of the preceding film 3a fed first and the front end of the trailing film 3b fed from the new film roll 9 are spliced to each other in the splicing section 11.

A reservoir 29 is disposed between the film supply chamber 4 and the tenter section 5 to constitute a loop of the film 3 having a length longer than the length necessary for the film splicing process. Accordingly, since the film 3 housed in the reservoir 29 is fed to the tenter section 5 at the time of splicing the preceding film and trailing film, it is possible to perform the splicing process of the film 3 without stopping the operation of the tenter section 5.

Figure 2:
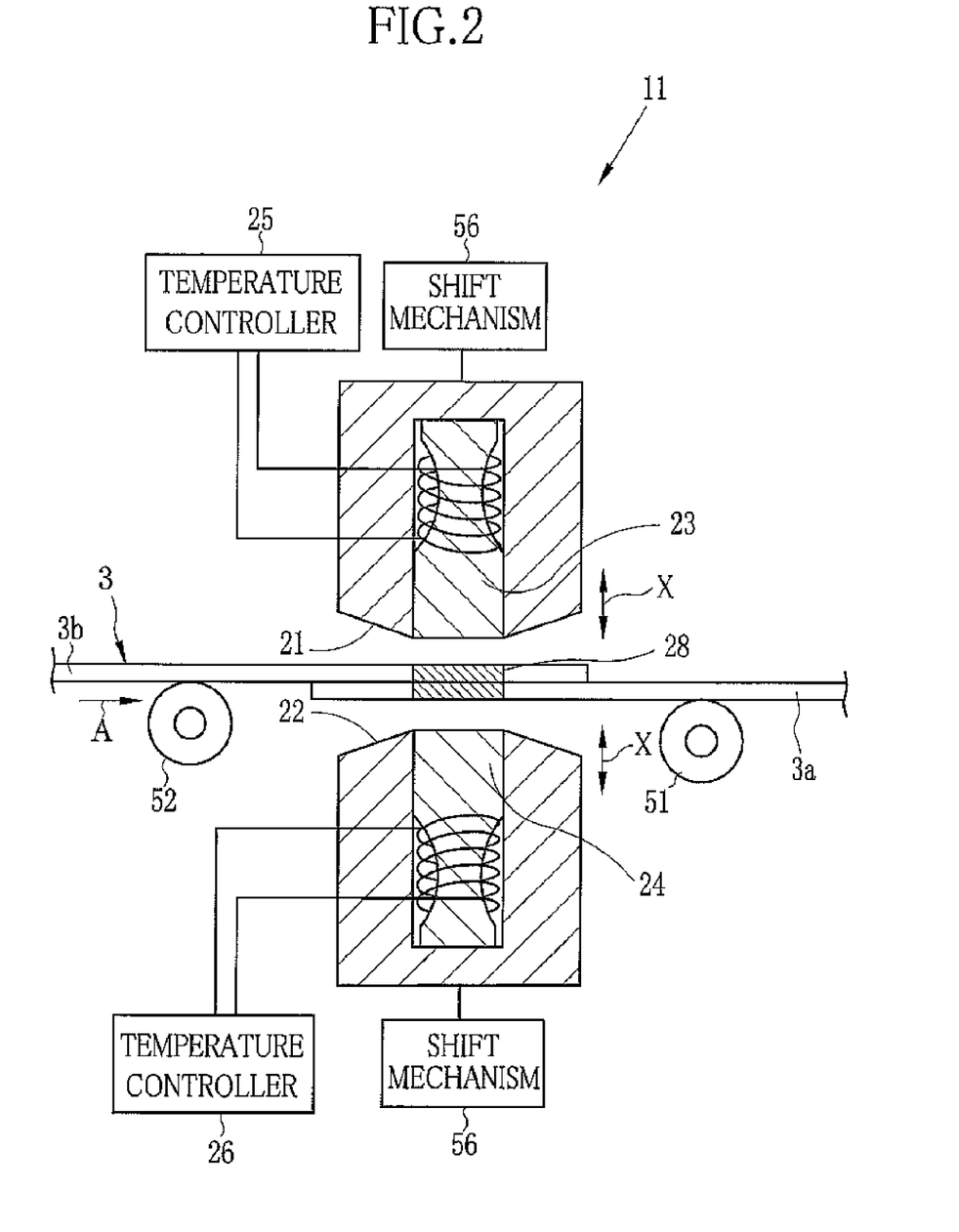
FIG. 2 is a plan view illustrating a preceding film, a trailing film, and a heat sealer.
Figure 4A:
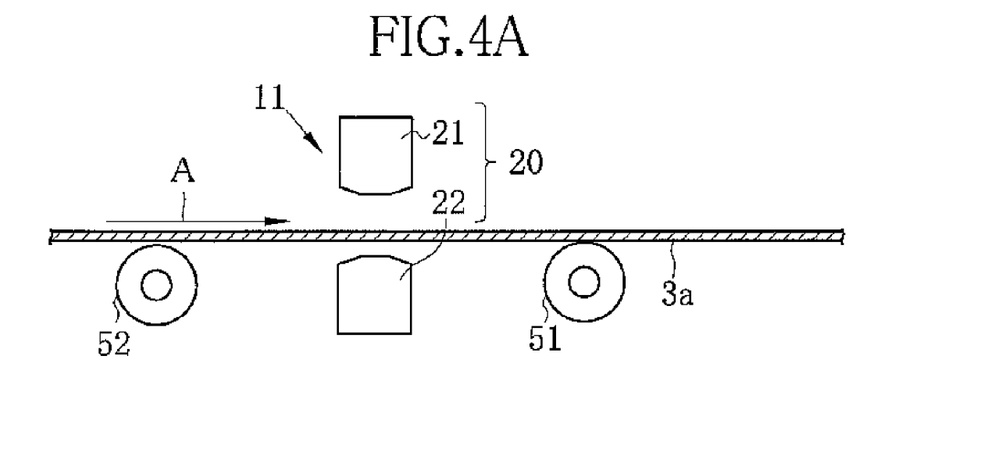
FIG. 4 is a side view illustrating a procedure of a welding process with use of the welding heads.

As shown in FIG. 2, the splicing section 11 includes a support roller 51 for supporting the preceding film 3a and a support roller 52 for supporting the trailing film 3b. In order to supply the film 3 continuously to the tenter section 5, in the splicing section 11, a rear end of a preceding film 3a fed in first and a front end of a trailing film 3b fed following the preceding film 3a are overlapped with each other to be spliced by thermal welding with use of a heat sealer 20. (Not that, welding means melting and connecting the films by applying heat.) As shown in FIG. 4A, for example, the heat sealer 20 includes an upper welding head 21 and a lower welding head 22 provided so as to sandwich a transporting path of the film 3 therebetween. The upper welding head 21 has a heater 23 exposed from its lower surface, and the lower welding head 22 has a heater 24 exposed from its upper surface. A shift mechanism 56 causes each of the upper welding head 21 and lower welding head 22 to move between a heating position and a retracted position. The heaters 23 and 24 are caused to contact with the film 3 at the heating position. The heaters 23 and 24 are caused to be retracted from the film 3 at the retracted position. The temperature of each of the heaters 23 and 24 is controlled by heat controllers 25 and 26 and sensors (not shown) respectively.

Figure 3:
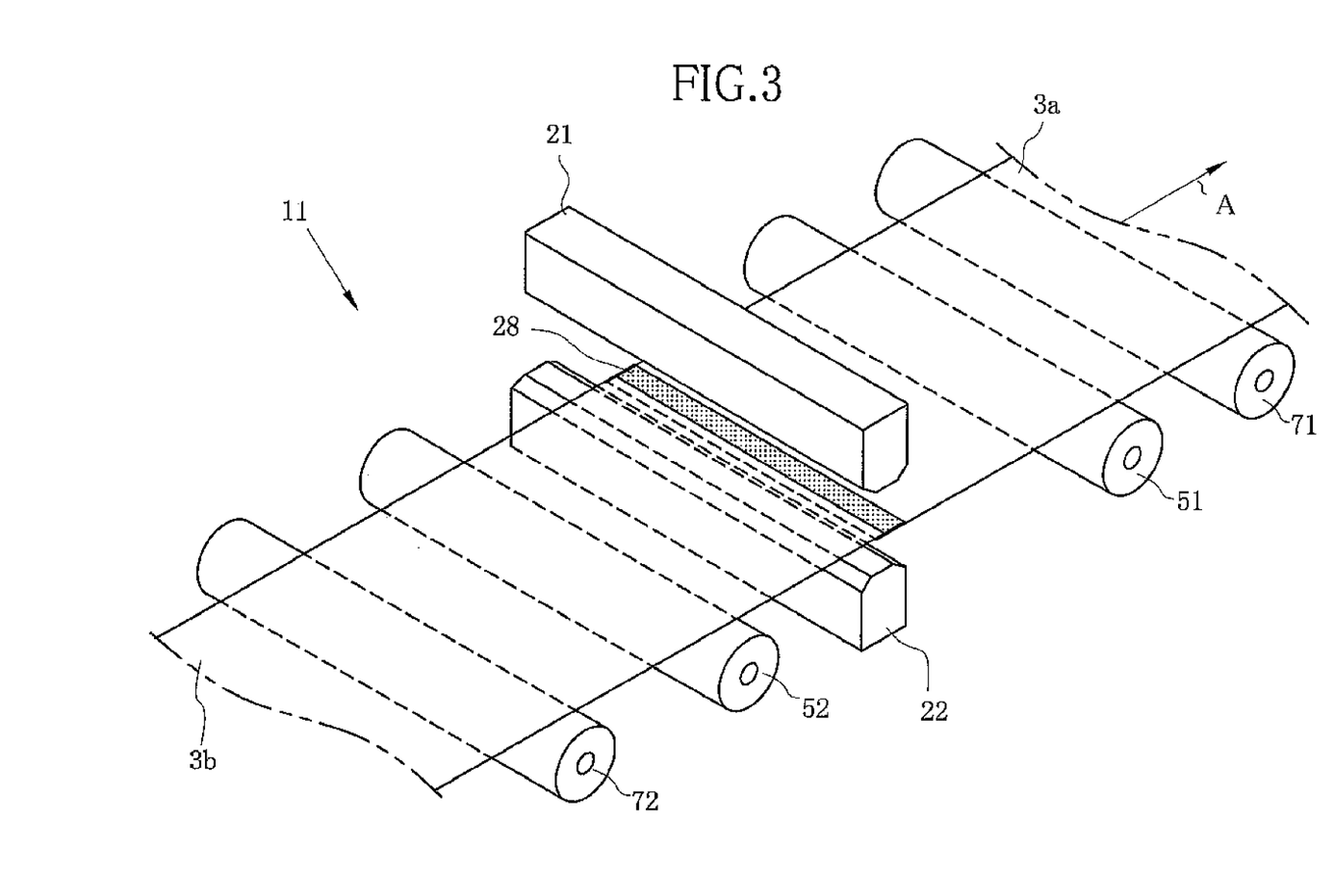
FIG. 3 is a perspective view illustrating the preceding film, the trailing film, and welding heads.

As shown in FIG. 3, the splicing section 11 includes four support rollers 51, 52, 71, and 72. The number of the support rollers is not limited four, and any number of support rollers may be provided as long as they can support the film. As shown in the drawing, the width of each of the support rollers 51, 52, 71, and 72, and the welding heads 21 and 22 is made longer than that of the film 3 to be transported.

Figure 4B:
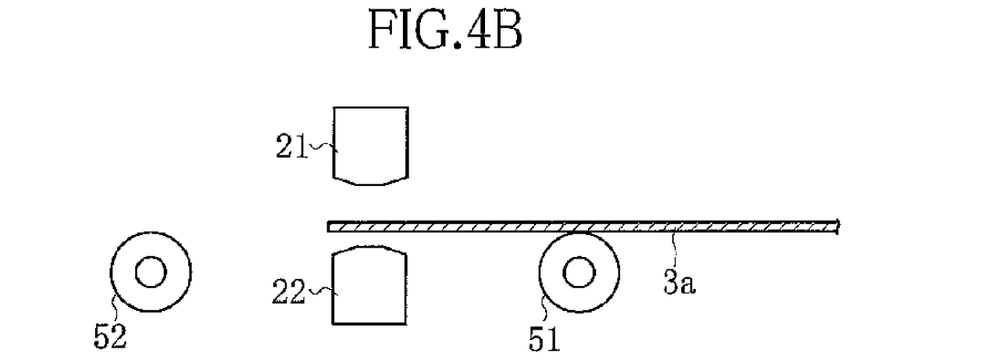

The process for splicing the preceding and trailing films with use of the heat sealer 20 is described hereinafter. FIG. 4 shows a procedure of welding the portion in which the preceding film 3a and the trailing film 3b are overlapped with each other with use of the welding heads 21 and 22. FIG. 4A shows a state in which the preceding film 3a passes through the splicing section 11. When the feeding of the film 3a from the film roll 9 is finished as shown in FIG. 1, the rear end of the preceding film 3a is stopped at the welding position (also referred to as heating position) of the splicing section 11 as shown in FIG. 4B. The upper welding head 21 is located above the welding position, and the lower welding head 22 is located below the welding position.

Figure 4C:
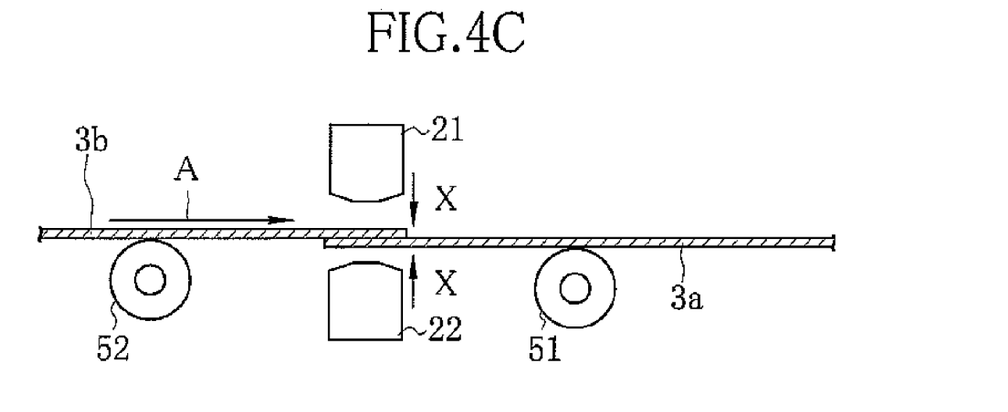

Next, in the film feeding device 10 shown in FIG. 1, the new film roll 9 is set at the film feeding position 16, and the trailing film 3b is fed therefrom. After the rear end of the preceding film 3a and the front end of the trailing film 3b are overlapped at the welding position, as shown in FIG. 4C, the feeding of the trailing film 3b is stopped.

Figure 4D:
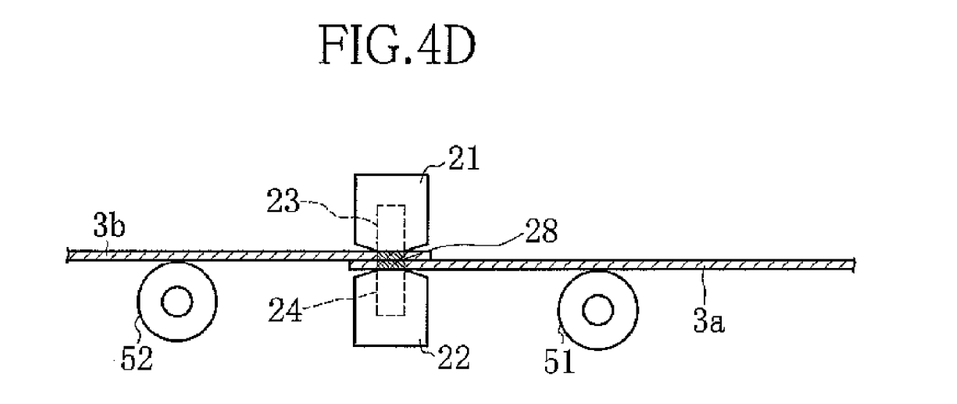

Next, as shown in FIG. 4D, the upper welding head 21 moves downwards and the lower welding head 22 moves upwards, to sandwich the portion in which films 3a and 3b are overlapped with each other therebetween. In accordance with that, each of the heaters 23 and 24 is set to a predetermined temperature by the temperature controller 25 and 26. The temperature is set such that the film 3 is welded but not decomposed, for example, within the range of 150° C. to 299° C. The portion in which the films 3a and 3b are overlapped with each other is heated by the welding heads 21 and 22 respectively provided above and below the portion, and the portion is partially melted to be spliced with each other, to form the welded portion (spliced area) 28. The portion is heated for a desired period of time, and thereafter the heating is stopped. The portion is naturally cooled while being nipped therebetween for a desired period of time. Thereby, the rear end of the preceding film 3a and the front end of the trailing film 3b are spliced with each other on the welded portion 28. Note that instead of natural cooling, a cooling device may be provided at each of the welding heads 21 and 22 in order to cool the overlapped portion in a press-contact manner.

Figure 4E:
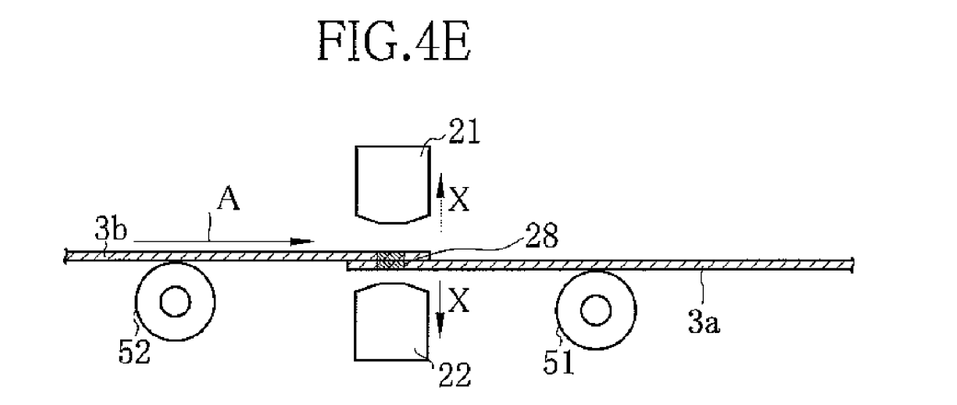

Next, as shown in FIG. 4E, the upper welding head 21 moves upwards and the lower welding head 22 moves downwards, and thereby both welding heads 21 and 22 are respectively set to the retracted position away from the welding position. Then, the films 3a and 3b start to be fed.

As described above, the portion in which the films 3a and 3b are overlapped with each other is heated from both upper and lower sides, and therefore the heat transfer distance between the surface of the heated film and the film splicing surface can be shortened to approximately half in comparison with a case where only one head is used for welding of the films in a conventional manner. Accordingly, the films can be welded while the temperature of the portion in which the films 3a and 3b are overlapped with each other is kept at a level equal to or less than the decomposition temperature of the polymer. Additionally, it is also possible to prevent occurrence of pitting on the welded portion and degradation of the polymer in the polymer film having a melting point of the polymer and decomposition point thereof close to each other.

Note that instead of using the welding heads 53 and 54 provided so as to extend along the film width direction, a pair of welding rollers containing heaters may be disposed so as to sandwich the portion in which the rear end of the preceding film 3a and the front end of the trailing film 3b are overlapped with each other in a film overlapping direction such that the pair of welding rollers are rolled in contact with the overlapped portion in the film width direction. Note that, the film overlapping direction is a direction so as to sandwich the films from above and below in a vertical direction, as indicated by arrows X in FIG. 2, for example.

Figure 5:
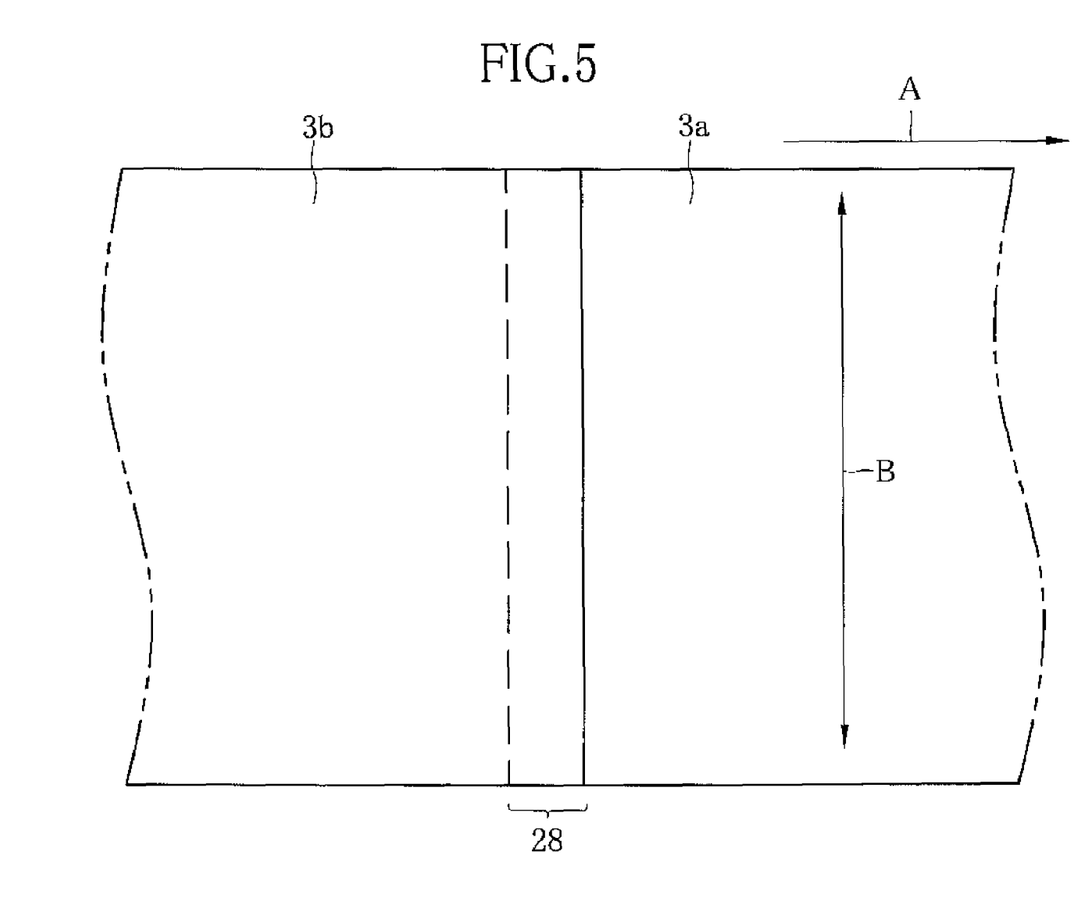
FIG. 5 is a view illustrating the preceding film and the trailing film.

In a case where the preceding and trailing films 3a and 3b are spliced to each other with use of the heat sealer 20 as shown in FIG. 5, in the film 3 subjected to the stretching process and a heat treatment for stress relaxation, a shrinkage amount of the spliced area 28 and a shrinkage amount of an area around the spliced area 28 (hereinafter referred to as peripheral area) are equal to each other, and a width of the spliced area 28 after shrinkage (after heat treatment for stress relaxation) and a width of the peripheral area after shrinkage become equal to each other. Note that the stretching process and the heat treatment for stress relaxation are described in detail later.

Further, in a case where the preceding and trailing films 3a and 3b are spliced to each other with use of the heat sealer 20 as described above, since different materials are not contained in the spliced area 28, the spliced area 28 can be reused as a material of the film. Note that, instead of the heat sealer 20, an impulse sealer can be used for thermal-welding and splicing of the films.

Figure 6:
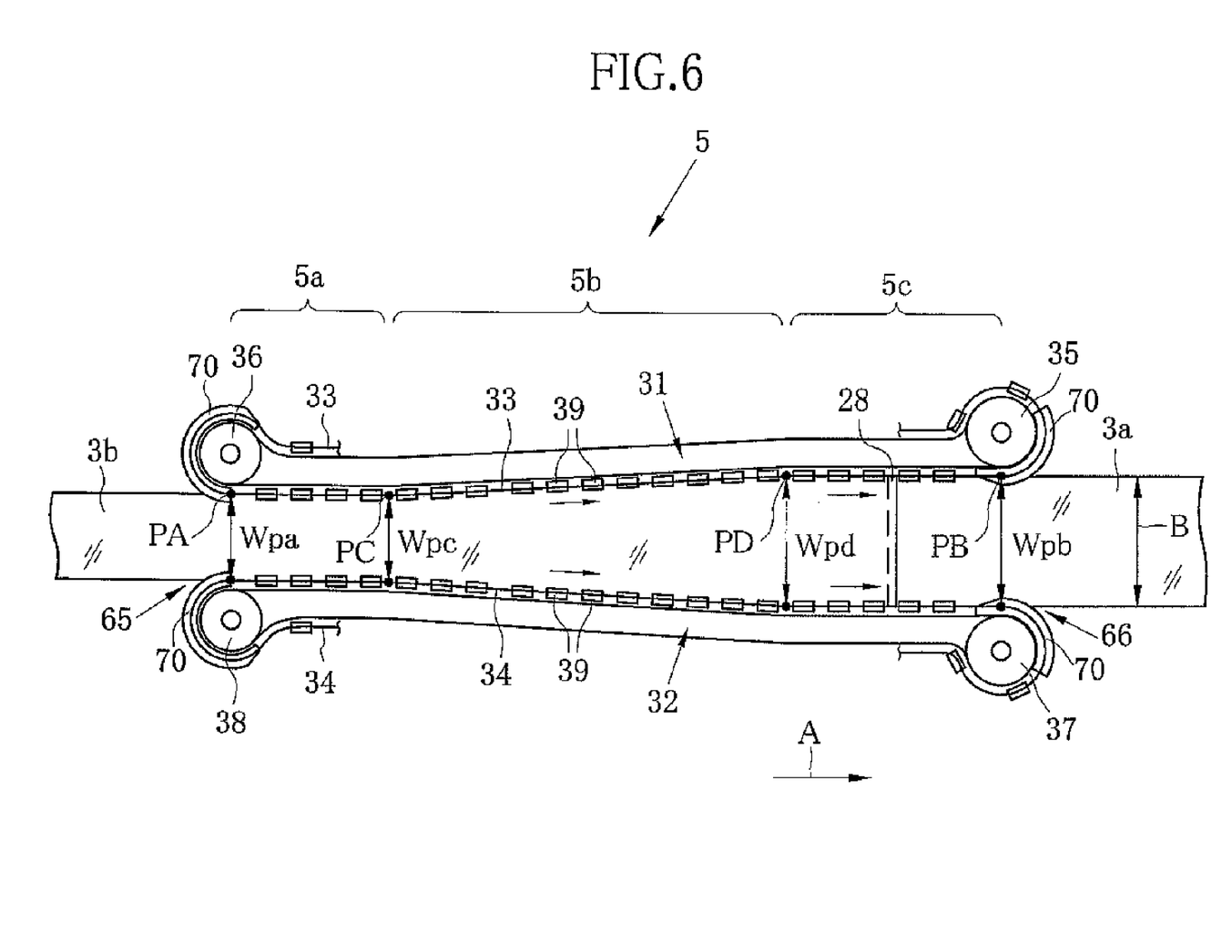
FIG. 6 is a plan view illustrating a tenter section.

As shown in FIG. 6, in the tenter section 5, the film 3 is stretched in the film width direction B while being transported in the film transporting direction A. The tenter section 5 includes a first rail 31, a second rail 32, a first chain (endless chain) 33 guided by the first rail 31, and a second chain (endless chain) 34 guided by the second rail 32.

The first chain 33 is bridged over a driving sprocket wheel 35 and a driven sprocket wheel 36, and the second chain 34 is bridged over a driving sprocket wheel 37 and a driven sprocket wheel 38. The driving sprocket wheels 35 and 37 are disposed at a side of tenter outlet 66, and caused to rotate by a not-shown driver. The driven sprocket wheels 36 and 38 are disposed at a side of tenter inlet 65.

The first chain 33 and the second chain 34 are provided with plural clips 39 at a predetermined interval. While holding the side edges of the film 3, the clips 39 move along the rails 31 and 32, to stretch the film 3 in the film width direction B. The clips 39 start holding the film 3 at a point PA, and release the film 3 at a point PB. The clips 39 start stretching the film 3 at a point PC, and finish stretching the film 3 at a point PD. Under the stretching process, the film width Wpa at the point PA, the film width Wpb at the point PB, the film width Wpc at the point PC, and the film width Wpd at the point PD satisfy a formula: Wpa=Wpc≦Wpd=Wpb. Although the stretching ratio of the film 3 is appropriately changed in accordance with the desired optical properties or the like, the film 3 is preferably stretched in the film width direction B by 100.5% to 300%.

The tenter section 5 is disposed in a drying chamber (not-shown). The tenter section 5 is divided into a preheating zone 5a, a heating/stretching zone 5b, and a heat treatment for stress relaxation/stretching relaxation zone 5c in this order from the downstream side in the film transporting direction A. The film 3 is preheated while being transported with the film width kept at Wpa in the preheating zone 5a. The distance between the pair of clips 39 does not change, and the film 3 is not stretched by the clips 39 in the film width direction B. In the heating/stretching zone 5b, the film 3 is heated, and the distance between the pair of clips 39 gradually increases from Wpc to Wpd. In the heat treatment for stress relaxation/stretching relaxation zone 5c, the film 3 is heated while being transported with the film width kept at Wpd, to be subjected to the heat treatment for stress relaxation, and the film 3 is stretched by the clips 39 in the film width direction B. The distance between the pair of clips 39 gradually decreases or does not change, and the film 3 is subjected to the stretching relaxation (heat treatment for stress relaxation).

Figure 7:
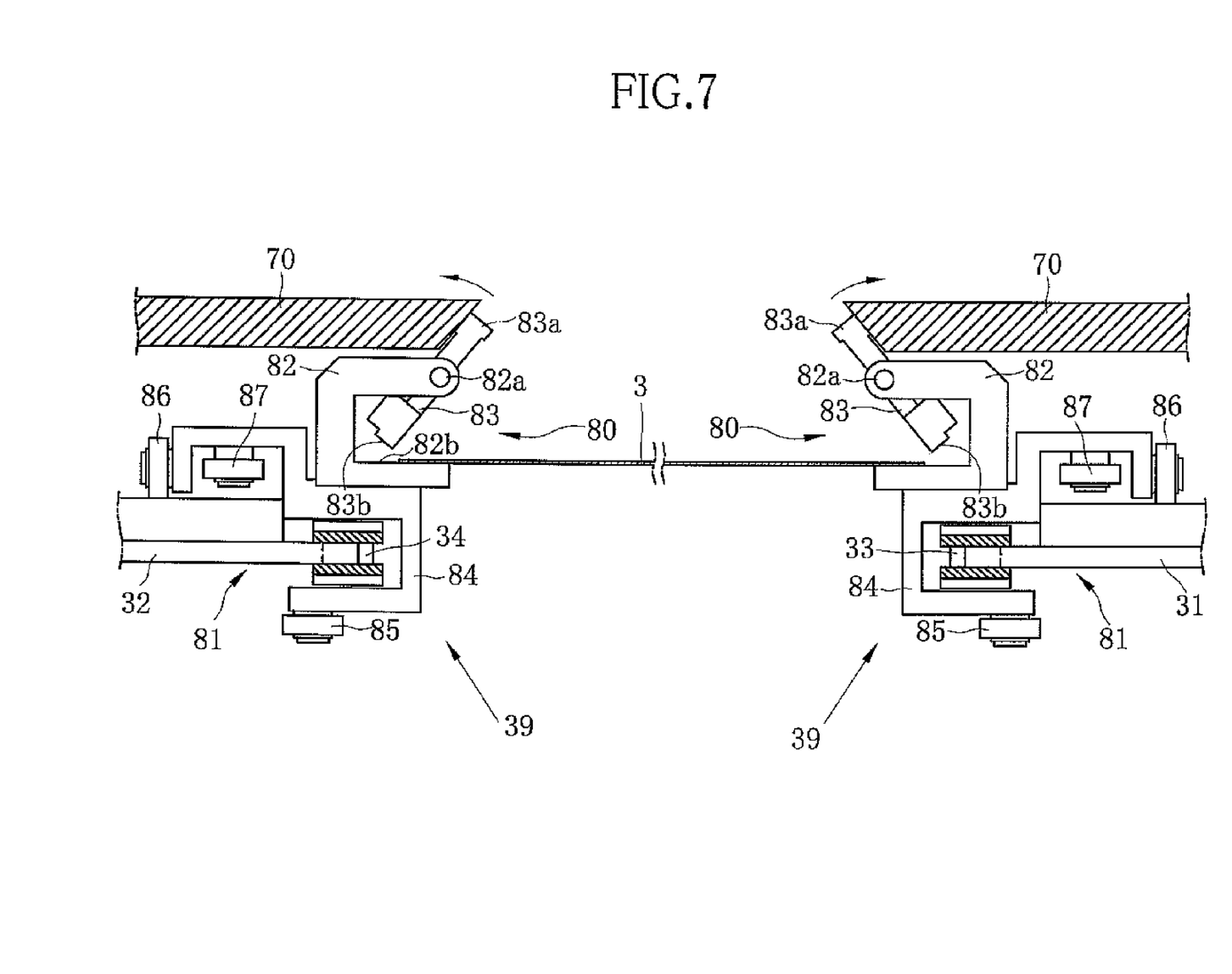
FIG. 7 is a front view illustrating a clip.

As shown in FIG. 7, the clip 39 consists of a clip main body 80 and a rail attachment portion 81. The clip main body 80 consists of a frame 82 having an approximately inverted U shape and a flapper 83. The flapper 83 is rotatably mounted to the frame 82 by a mounting shaft 82a. The flapper 83 shifts between a film holding position (closed position) and a film releasing position. At the film holding position, the flapper 83 stands approximately vertically. At the film releasing position, a releasing member 70 contacts with an engaging head 83a and rotates in an oblique direction. The flapper 83 is generally biased under its own weight or by a spring (not shown) so as to be set at the film holding position. The film 3 is held between a film holding surface 82b and a flapper lower surface 83b at the film holding position.

The rail attachment portion 81 consists of an attachment frame 84, and guide rollers 85, 86, and 87. The attachment frame 84 is provided with the first chain 33 or the second chain 34. The guide rollers 85 to 87 respectively contact with each support surface of the driving sprocket wheels 35 and 37 (see FIG. 6) or a support surface of the first rail 31 or the second rail 32, and thereby rotates. As a result, the clip main body 80 does not fall from the driving sprocket wheels 35 and 37, and the rails 31 and 32, and is guided along the first and second rails 31 and 32.

The releasing member 70 of the clip 39 is disposed so as to be close to the sprocket wheels 35 to 38 (see FIG. 6). At the driven sprocket wheels 36 and 38 at the side of tenter inlet 65 (see FIG. 6), the releasing member 70 contacts with the engaging head 83a of the clip 39 to release the engaging head 83a in front of the film holding position PA, and thereby the side ends of the film 3 can be transported to the tenter section 5. When the film 3 passes through the film holding position PA, the releasing member 70 moves away from the engaging head 83a, and the clips 39 is moved away from the releasing position to be set at the film holding position. Thus, the side ends of the film 3 are held. Similarly, at the driving sprocket wheels 35 and 37 at the side of the tenter outlet 66, the clips 39 are set to the releasing position by the releasing member 70 at the film releasing position PB, and thereby the holding of the side ends of the film 3 are canceled.

Returning to FIG. 1, the film 3 is stretched in the tenter section 5 and sent to a slitting device 40. The side edges of the film 3, which were held by the clips 39, are cut off at a predetermined cutting line by the slitting device 40, and the side edges thus cut away as slits are cut into pieces by a cut blower 41. The side edges thus cut into pieces are sent to a crusher 42 by a not-shown blowing device and crushed into chips by the crusher 42. The chips are reused for preparing the dope, thus resulting in improvement in cost.

The side edges of the preceding film 3a and the trailing film 3b are reused. In a case where the preceding film 3a and the trailing film 3b are spliced with use of the splicing tape, it is necessary to remove the splicing tape from the side edges to reuse the side edges. However, in a case where the preceding film 3a and the trailing film 3b are spliced with use of the heat sealer 20, since the splicing section 11 contains no substances different from those of the film 3 and the splicing section 11 can be reused in the material recycle, the edges in the spliced state can be used directly. Thus, it is possible to save trouble of removing the splicing tape at the time of reusing, and increase operability in recovering of the side edges. Further, it is possible to simplify the structure of the off-line stretching device 2. The film 3 whose side edges are cut away by the slitting device 40 is sent to the relaxation chamber 6.

The relaxation chamber 6 includes plural rollers 43, and the film 3 is transported by the rollers 43 in the relaxation chamber 6. Air at a desired temperature is blown to the relaxation chamber 6 by a blower (drying air duct) (not-shown) to subject the film 3 to heat treatment for stress relaxation. The temperature of the air is preferably in the range of 20° C. to 250° C. The temperature of the film 3 is gradually decreased.

The film 3 subjected to the heat treatment for stress relaxation is sent to the cooling chamber 7 to be cooled to 30° C. or less, and then sent to the winding chamber 8. The winding chamber 8 includes a winding device 47 provided with a winding roller 44 and a press roller 45. The film 3 sent to the winding chamber 8 is wound by the winding roller 44 while being pressed by the press roller 45.

The film 3 can be formed by any well-known solution casting method. For example, the TAC film disclosed in Japanese Patent Laid-Open Publication No. 2005-104148 can be used. In particular, for the purpose of improving the film producing speed, the present invention is applied to the TAC film formed as follows. Dope containing TAC and a solvent is cast onto a cooled peripheral surface of the casting drum to form a casting film. After being cooled and turning into gel, the casting film is solidified. The solidified casting film is peeled as a wet film from the casting drum and sent to a pin tenter to be dried and form a film. The film is wound in a roll manner and housed to obtain the TAC film. Thereby, according to the present invention, it is possible to efficiently form the TAC film having excellent optical properties.

Embodiment 2

Figure 8:
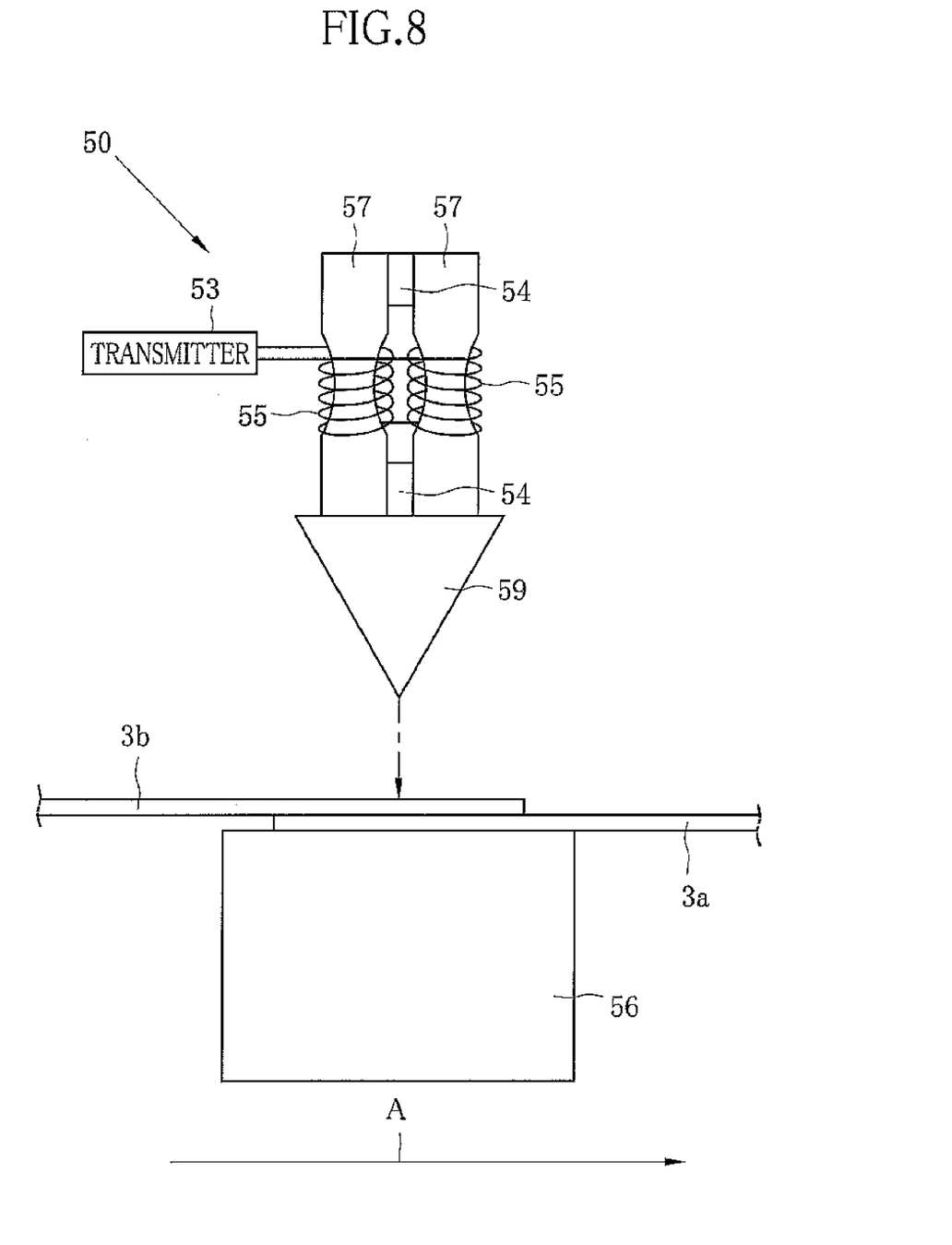
FIG. 8 is a side view illustrating an ultrasonic splicer.

Although the preceding film 3a and the trailing film 3b are spliced to each other with use of the heat sealer 20 in the splicing section 11 in Embodiment 1, alternatively, as shown in FIG. 8, an ultrasonic splicer 50 can be used to splice the preceding film 3a and the trailing film 3b.

The ultrasonic splicer 50 mechanically vibrates the film 3, for example, 20,000 to 28,000 times/sec at the amplitude of 0.03 mm, to heat and weld the film 3. The ultrasonic splicer 50 includes two transducers 57, a horn 59, and a transmitter 53. A permanent magnet 54 is disposed between the transducers 57. A coil 55 is bridged over each of the transducers 57. The transmitter 53 causes the coil 55 to drive the transducers 57. The transducer 57 converts electrical vibration to mechanical vibration. The horn 59 amplifies the mechanical vibration caused by the transducer 57 to apply energy to the rear end of the preceding film 3a and the front end of the trailing film 3b (vibrate the rear end of the preceding film 3a and the front end of the trailing film 3b) mounted on a mounting base 56. The rear end of the preceding film 3a and the front end of the trailing film 3b are heated by the vibration to be welded and spliced to each other.

Embodiment 3

Figure 9:
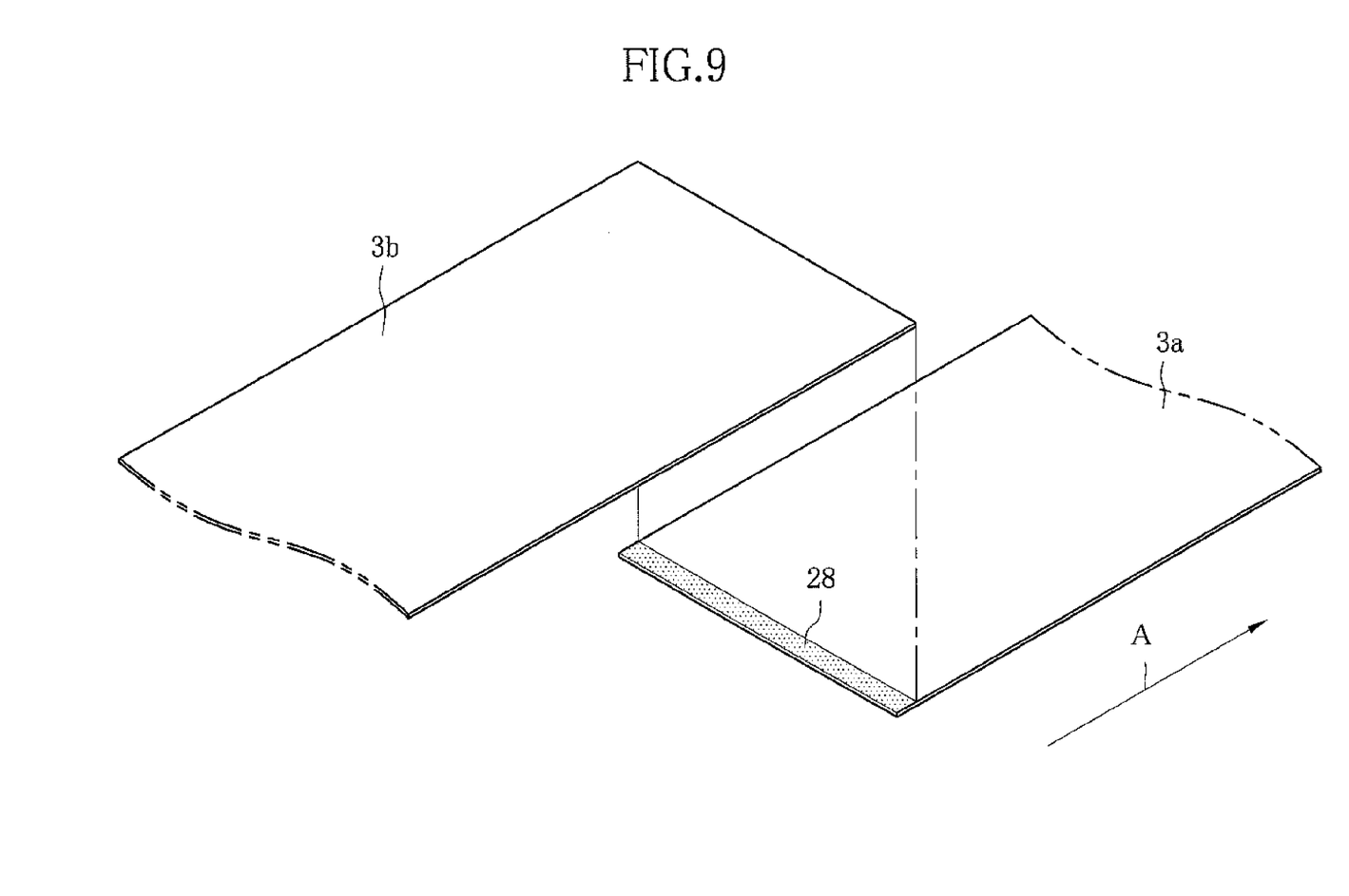
FIG. 9 is a perspective view illustrating the preceding film whose rear end is coated with acetone, and the trailing film.

Although the preceding film 3a and the trailing film 3b are spliced to each other with use of the heat sealer 20 in the splicing section 11 in Embodiment 1, alternatively, as shown in FIG. 9, the splicing may be performed with use of acetone as one of the solvents contained in the dope used in forming the TAC film.

Acetone is applied to the spliced area 28 at the rear end of the preceding film 3a by spraying, and then the front end of the trailing film 3b is put on the rear end of the preceding film 3a. Thereafter, the rear end of the preceding film 3a and the front end of the trailing film 3b are spliced to each other by the acetone in a press-contact manner.

Embodiment 4

Figure 10:
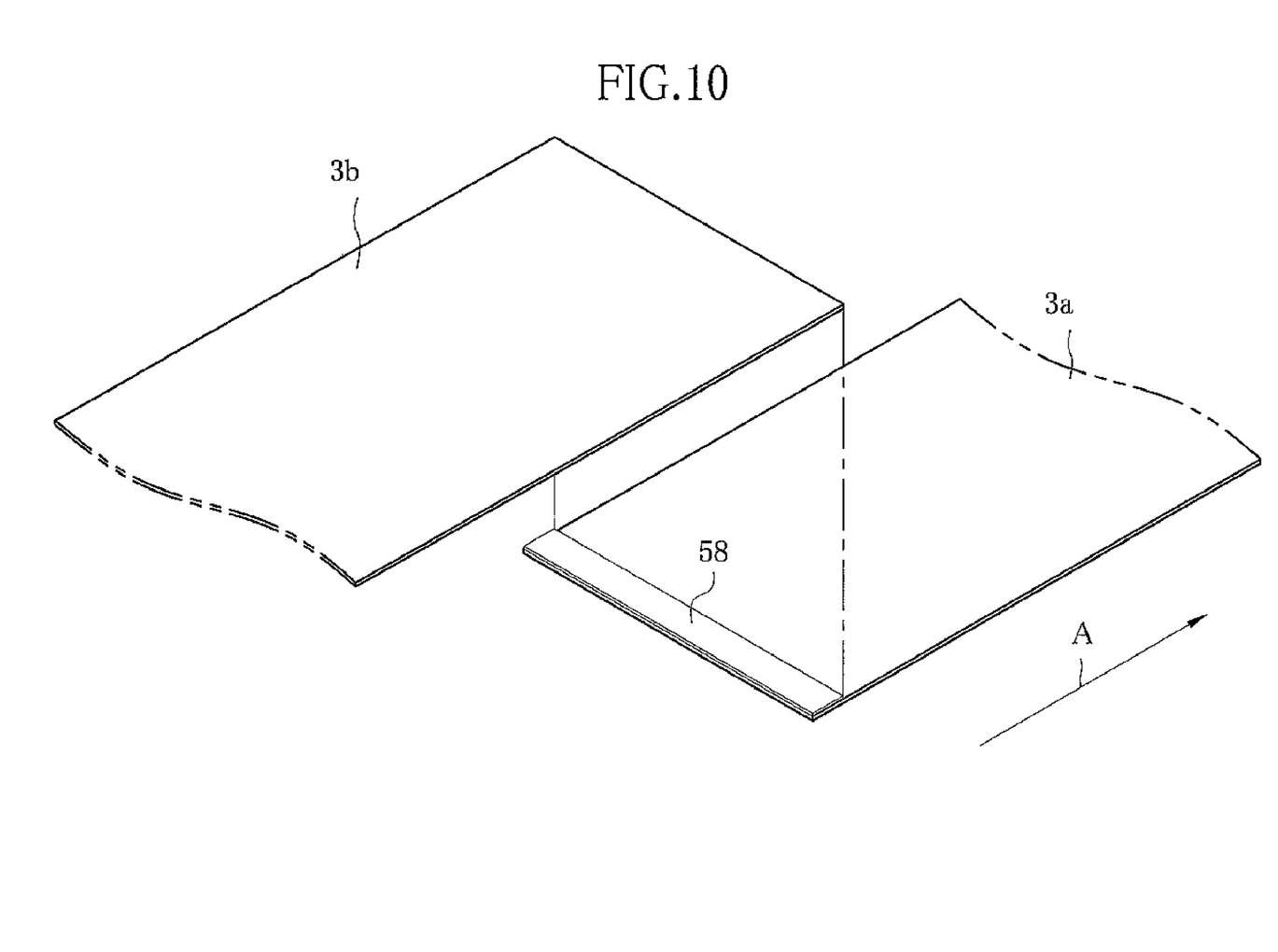
FIG. 10 is a perspective view illustrating the preceding film, the trailing film, and a double-sided splicing tape.

Although the preceding film 3a and the trailing film 3b are spliced to each other with use of the heat sealer 20 in the splicing section 11 in Embodiment 1, alternatively, as shown in FIG. 10, a double-sided splicing tape 58 having no base at No. 5919ML produced by NITTO DENKO CORPORATION may be used to splice the preceding film 3a and the trailing film 3b. The double-sided splicing tape 58 having no base is adhered to the spliced area 28 of the preceding film 3a, and the trailing film 3b is adhered thereon, to splice the preceding film 3a and the trailing film 3b.

Although the TAC film is used as the polymer film according to the first to fourth embodiments, the present invention is not limited to the TAC film. The present invention is also applicable to other cellulose ester films, for example, cellulose acetate propionate film, and various kinds of polymer films.

Example

The film 3 stretched in the tenter section 5 was subjected to heat treatment for stress relaxation in the relaxation chamber 6. After the heat treatment for stress relaxation, the film 3 shrunk in the film width direction B.

The film 3 obtained by splicing the rear end of the preceding film 3a and the front end of the trailing film 3b according to each of the splicing methods in Embodiments 1 to 4 was subjected to the stretching process and heat treatment for stress relaxation in the off-line stretching device 2. Then, the film width of the spliced area 28 after shrinkage (heat treatment for stress relaxation) and the film width of the peripheral area after shrinkage were measured to obtain results shown in Examples 1 to 4. Note that the preceding film 3a and the trailing film 3b were TAC films and had a product width of 80 μm. The width of the film 3 before the stretching was 640 mm, and the width of the film 3 after the stretching was 862 mm. After the stretching, in order to remove the deformed portion of the film 3 caused by being held by the clips 39, the side edges of the film 3 were cut off by the slitting device 40 such that the width of the film 3 became 660 mm. The film 3 whose side edges were cut away was subjected to heat treatment for stress relaxation in the relaxation chamber 6. Moreover, as shown in FIG. 11, the preceding film 3a and the trailing film 3b were overlapped with each other, and a single-sided splicing tape 60 with a base of No. 31B produced by NITTO DENKO CORPORATION was adhered thereto so as to extend in the film width direction B, thus obtaining the result shown in Comparative Example. The other conditions of Comparative Example are the same as those in Examples 1 to 4.

The results of the experiments are shown in Table 1. In Table 1, P (Pass) represents a state of a film after shrinkage, in which there occurred no wrinkles in the spliced area 28 and there occurred no tears in the peripheral area. F (Fault) represents a state of a film after shrinkage, in which there occurred wrinkles in the spliced area 28 or there occurred tears in the peripheral area.

TABLE 1

|  | Width of spliced area after shrinkage | Width of peripheral area after shrinkage | State of film after shrinkage |
| --- | --- | --- | --- |
| Example 1 | 650 mm | 650 mm | P |
| Example 2 | 650 mm | 650 mm | P |
| Example 3 | 650 mm | 650 mm | P |
| Example 4 | 650 mm | 650 mm | P |
| Comparative Example | 625 mm | 650 mm | F |

The film width before shrinkage: 660 mm

For thermal welding of the spliced area 28, the heat sealer 20 was used in Example 1, the ultrasonic splicer 50 was used in Example 2, the acetone was used in Example 3, the double-sided splicing tape 58 having no base was used in Example 4. As a result of the experiments, in Examples 1 to 4, the shrinkage amount of the spliced area 28 was equal to that of the peripheral area. The film width of the spliced area 28 was equal to that of the peripheral area. Therefore, there occurred no wrinkles in the spliced area 28, and thus leading to excellent results. Further, there occurred no tears in the peripheral area, and thus leading to excellent results.

As described above, the rear end of the preceding film 3a and the front end of the trailing film 3b are spliced to each other by thermal welding with use of the heat sealer 20 or the ultrasonic splicer 50, by welding with use of acetone, or by joining with use of the double-sided splicing tape 58 having no base, and thereby it is possible to make the shrinkage amount of the spliced area 28 and the shrinkage amount of the peripheral area equal to each other. Accordingly, it is possible to prevent occurrence of wrinkles in the spliced area 28 and tears in the peripheral area. Thus, it is possible to increase the area of the film capable of being used as a product in comparison with the films formed in a conventional manner.

Further, since it is possible to make the film width of the spliced area 28 after shrinkage and the film width of the peripheral area after shrinkage equal to each other, the control for preventing meandering of the film 3 and transporting the film 3 precisely with use of the EPC can be secured in comparison with the case where the film width of the spliced area 28 and the film width of the peripheral area are different from each other as shown in FIG. 11.

The present invention is not to be limited to the above embodiments, and on the contrary, various modifications will be possible without departing from the scope and spirit of the present invention as specified in claims appended hereto.

What is claimed is:

1. A polymer film stretching method comprising:
splicing a rear end of a preceding polymer film and a front end of a trailing polymer film by welding a portion in which said rear end of said preceding film and said front end of said trailing film are overlapped with each other;
transporting continuously said polymer film after being spliced;
heating and stretching said transported polymer film by holding side ends of said polymer film with use of plural clips in a film width direction; and
subjecting said polymer film after being stretched to heat treatment for stress relaxation while continuously transporting said polymer film, such that a shrinkage amount of a spliced area of said preceding and trailing polymer films and a shrinkage amount of an area around said spliced area becomes approximately equal to each other in said film width direction.

2. A polymer film stretching method as defined in claim 1, wherein said welding is performed with use of heat caused by a heat sealer.

3. A polymer film stretching method as defined in claim 1, wherein said welding is performed with use of heat caused by ultrasonic vibration of an ultrasonic splicer.

4. A polymer film stretching method as defined in claim 1, wherein said welding is performed with use of a polymer solvent.

5. A polymer film stretching method comprising:
splicing a rear end of a preceding polymer film and a front end of a trailing polymer film by adhering a splicing tape having an adhesive layer and no base to a portion in which said rear end of said preceding film and said front end of said trailing film are overlapped with each other;
transporting continuously said polymer film after being spliced;
heating and stretching said transported polymer film by holding side ends of said polymer film with use of plural clips in a film width direction; and
subjecting said polymer film after being stretched to heat treatment for stress relaxation while continuously transporting said polymer film, such that a shrinkage amount of a spliced area of said preceding and trailing polymer films and a shrinkage amount of an area around said spliced area becomes approximately equal to each other in said film width direction.

* * * * *